United States Patent
Bhardwaj et al.

(10) Patent No.: US 8,816,648 B2
(45) Date of Patent: Aug. 26, 2014

(54) MODULATED, TEMPERATURE-BASED MULTI-CC-CV CHARGING TECHNIQUE FOR LI-ION/LI-POLYMER BATTERIES

(75) Inventors: Ramesh C. Bhardwaj, Fremont, CA (US); Taisup Hwang, Santa Clara, CA (US); Richard M. Mank, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 931 days.

(21) Appl. No.: 12/542,411

(22) Filed: Aug. 17, 2009

(65) Prior Publication Data

US 2011/0037438 A1      Feb. 17, 2011

(51) Int. Cl.
*H02J 7/04*      (2006.01)

(52) U.S. Cl.
USPC .......................................... 320/153; 320/152

(58) Field of Classification Search
USPC .......................................... 320/152, 160, 153
See application file for complete search history.

(56) References Cited

U.S. PATENT DOCUMENTS

| | | | |
|---|---|---|---|
| 5,175,485 A * | 12/1992 | Joo | 320/159 |
| 6,275,006 B1 * | 8/2001 | Koike et al. | 320/125 |
| 6,326,769 B1 * | 12/2001 | Forsberg | 320/124 |
| 8,115,454 B2 * | 2/2012 | Cintra et al. | 320/140 |
| 2008/0238357 A1 * | 10/2008 | Bourilkov et al. | 320/106 |
| 2008/0238372 A1 * | 10/2008 | Cintra et al. | 320/137 |
| 2009/0259420 A1 * | 10/2009 | Greening et al. | 702/63 |

* cited by examiner

*Primary Examiner* — Drew A Dunn
*Assistant Examiner* — Robert Grant
(74) *Attorney, Agent, or Firm* — Park, Vaughan, Fleming & Dowler LLP; A. Richard Park (57) ABSTRACT

Some embodiments of the present invention provide a system that charges a battery. During operation, the system obtains a set of charging currents $\{I_1, \ldots, I_n\}$ and a set of charging voltages $\{V_1, \ldots, V_n\}$. Next, the system repeats constant-current and constant-voltage charging operations, starting with i=1 and incrementing i with every repetition, until a termination condition is reached. These constant-current and constant-voltage charging operations involve charging the battery using a constant current $I_i$ until a cell voltage of the battery reaches $V_i$, and then charging the battery using a constant voltage $V_i$ until a charging current is less than or equal to $I_{i+1}$.

19 Claims, 5 Drawing Sheets

MODULATED, TEMPERATURE-BASED MULTI-CC-CV CHARGING TECHNIQUE FOR LI-ION/LI-POLYMER BATTERIES

BACKGROUND

1. Field

The present invention relates to techniques for charging batteries. More specifically, the present invention relates to a technique for charging a lithium rechargeable battery using multistep constant-current and constant-voltage charging steps.

2. Related Art

Figure 1:
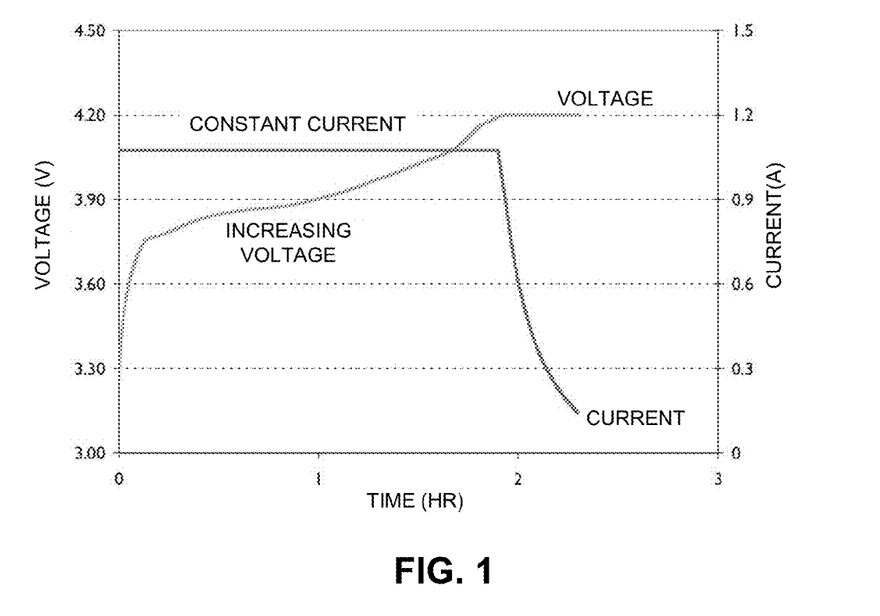
FIG. 1 illustrates a charging profile for a conventional charging technique.

Rechargeable lithium batteries, such as lithium-ion or lithium-polymer batteries, are presently used to power a wide variety of portable electrical systems, including laptop computers, cell phones, PDAs, digital music players and cordless power tools. A significant challenge in charging lithium rechargeable batteries is to avoid lithium surface saturation at a transport-limiting electrode, while keeping the charging time to a minimum. For example, a profile of a conventional constant-current charging technique is illustrated in FIG. 1. As illustrated in FIG. 1, a single cell is charged at a 0.5 C rate until the cell voltage reaches 4.2V. Once the cell voltage reaches 4.2V, the cell is topped off using a constant-voltage, wherein the current is allowed to decay to a lower limit 0.05 C rate. (C is defined as a multiple expressed in amperes (A) of the rated cell capacity for the cell expressed in ampere-hours (A·hr). For example, for a cell with a capacity of Qmax=2500 mA·hr, a "1 C" current would be 2500 mA.)

Conventional charging techniques have a number of drawbacks, such as poor charging efficiency at low temperatures, which can lead to lithium plating on the anode surface. Moreover, in a conventional battery pack, the individual cells and cell banks are often organized in a series stack, and can become unbalanced due to inadequate charging, which can result in a shortened battery cycle life. In addition to a shortened cycle life, constant-current charging techniques can also cause unsafe conditions in portable systems resulting from internal short formation due to Li plating.

Hence, what is needed is a method and an apparatus for charging a rechargeable battery without the drawbacks of the above-described conventional charging techniques.

SUMMARY

Some embodiments of the present invention provide a system that charges a battery. During operation, the system obtains a set of charging currents $\{I_1, \ldots I_n\}$ and a set of charging voltages $\{V_1, \ldots, V_n\}$. Next, the system repeats constant-current and constant-voltage charging operations, starting with i=1 and incrementing i with every repetition, until a termination condition is reached. These constant constant-current and constant-voltage charging operations involve, charging the battery using a constant current $I_i$ until a cell voltage of the battery reaches $V_i$, and then charging the battery using a constant voltage $V_i$ until a charging current is less than or equal to $I_{i+1}$.

In some embodiments, obtaining the set of charging currents and the set of charging voltages involves looking up the set of charging currents and the set of charging voltages in a lookup table based on a measured temperature of the battery.

In some embodiments, looking up the set of charging currents and the set of charging voltages additionally involves using a battery type of the battery to look up the set of charging currents and the set of charging voltages.

In some embodiments, the termination condition is reached when the charging current $I_i$ equals a terminal charging current $I_{term}$.

In some embodiments, the battery is a rechargeable lithium battery.

In some embodiments, the rechargeable lithium battery is a lithium-polymer battery.

In some embodiments, the rechargeable lithium battery is a lithium-ion battery.

In some embodiments, lithium-ion battery includes: a transport-limiting electrode; an electrolyte; a separator permeated with the electrolyte; and a non-transport-limiting electrode.

In some embodiments, the transport-limiting electrode is a negative electrode, and the non-transport-limiting electrode is a positive electrode.

BRIEF DESCRIPTION OF THE FIGURES

Table 1 illustrates charge capacities for two different battery cells in accordance with an embodiment of the present invention.

Table 2 illustrates cumulative and delta charge capacities for two different battery cells in accordance with an embodiment of the present invention.

Table 3 illustrates different parameters for the CC-CV charging technique for different temperature ranges.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention charges a battery through repetitions of a constant-current (CC) charging step followed by a constant-voltage (CV) charging step, wherein the parameters for the CC-CV charging steps are dependent on cell/battery temperatures. This improved CC-CV charging technique has a number of advantages over conventional charging techniques, including: eliminating lithium plating at low temperatures; improving rebalancing of cells within a battery pack; improving cycle life of battery cells; and enhancing protection against internal shorts which can lead to fire hazards.

Figure 2:
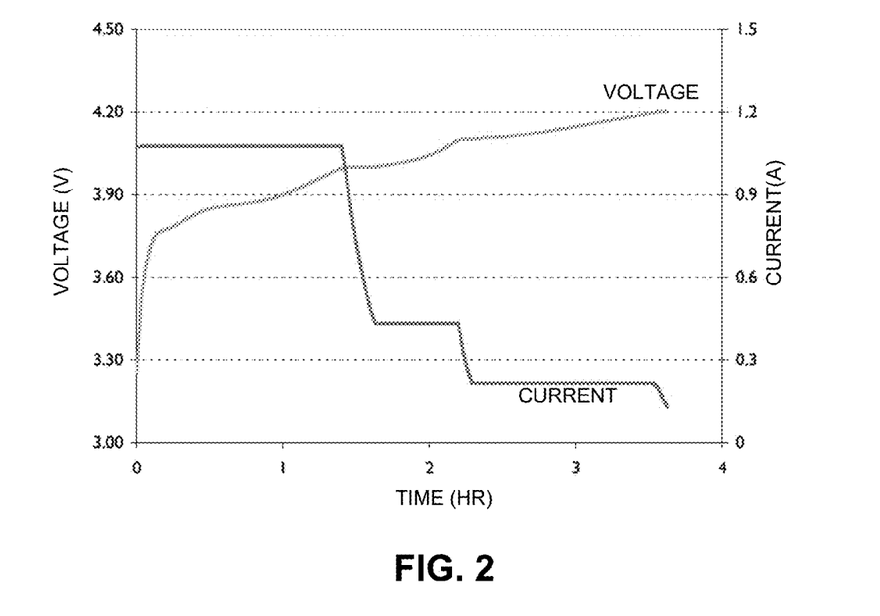
FIG. 2 illustrates a charging profile for a constant-current (CC), constant-voltage (CV) charging technique in accordance with an embodiment of the present invention.

A typical voltage-and-current profile for a charge cycle under this technique is illustrated in FIG. 2. FIG. 2 illustrates a number of constant-current charging steps, which alternate with constant-voltage charging steps. Note that during the constant-current charging steps the voltage rises, and during the constant-voltage charging steps the current falls. The efficacy of this new charging technique at 10° C. has been demonstrated empirically using a lithium reference electrode imbedded in the cell stack of finished cells. Moreover, this technique allows the individual potential of the cathode and anode to be monitored separately in addition to the cell voltage.

Based on a review of the scientific literature, a reference benchmark has been developed, wherein the anode potential (green line in FIGS. 3 and 4) versus a lithium reference electrode should exceed 30 millivolts at the end of the charging process. This voltage-measurement criterion was established to ensure that the lithium formed at the anode/electrolyte interphase during charging is properly intercalated into the active graphite particles that make up the anode. A less desirable alternative is to have the formed lithium deposit or plate onto the surface of the graphite where it is less stable. This instability results from the reactive nature of freshly plated lithium in contact with the electrolyte in the cell. Note that the resulting reaction can consume a portion of the surface-deposited lithium and electrolyte. This reduces the available lithium for discharge, which leads to a reduction in energy output. It additionally reduces cycle life and increases internal cell impedance.

A follow-up technique was also used to confirm that, at the end of the charging process, the lithium anode versus lithium reference potential was 30 millivolts. This technique involved disassembling cells after 10 consecutive cycles at 10° C. in the charged state to visually confirm whether or not lithium was present on the anode surface. This procedure was completed in a moisture-controlled environment. Although production lithium cells are made according to stringent requirements, significant performance variations exist between cells as manufactured, and may also arise with cycle life.

An important component of the observed variation in cell performance is the variation in internal cell impedance. Cell impedance is influenced by several factors, including the diffusion rate of lithium ions into the active graphite component of the anode during charge. If the applied charging current exceeds the diffusion rate capability of the lithium into the graphite particles, then surface lithium plating will occur. This issue is especially prominent at charging temperatures below 15° C. The use of a conventional non-adaptive charging technique, such as a singular constant-current rate which can exceed the diffusion rate capability of the anode, will result in marginal charge efficiency, lithium deposition on the anode surface, and reduced cycle life. Using a charging technique that can sense when a limit of the anode diffusion capability is reached and can adjust accordingly is preferred to address the performance deficiencies described above.

Figure 3:
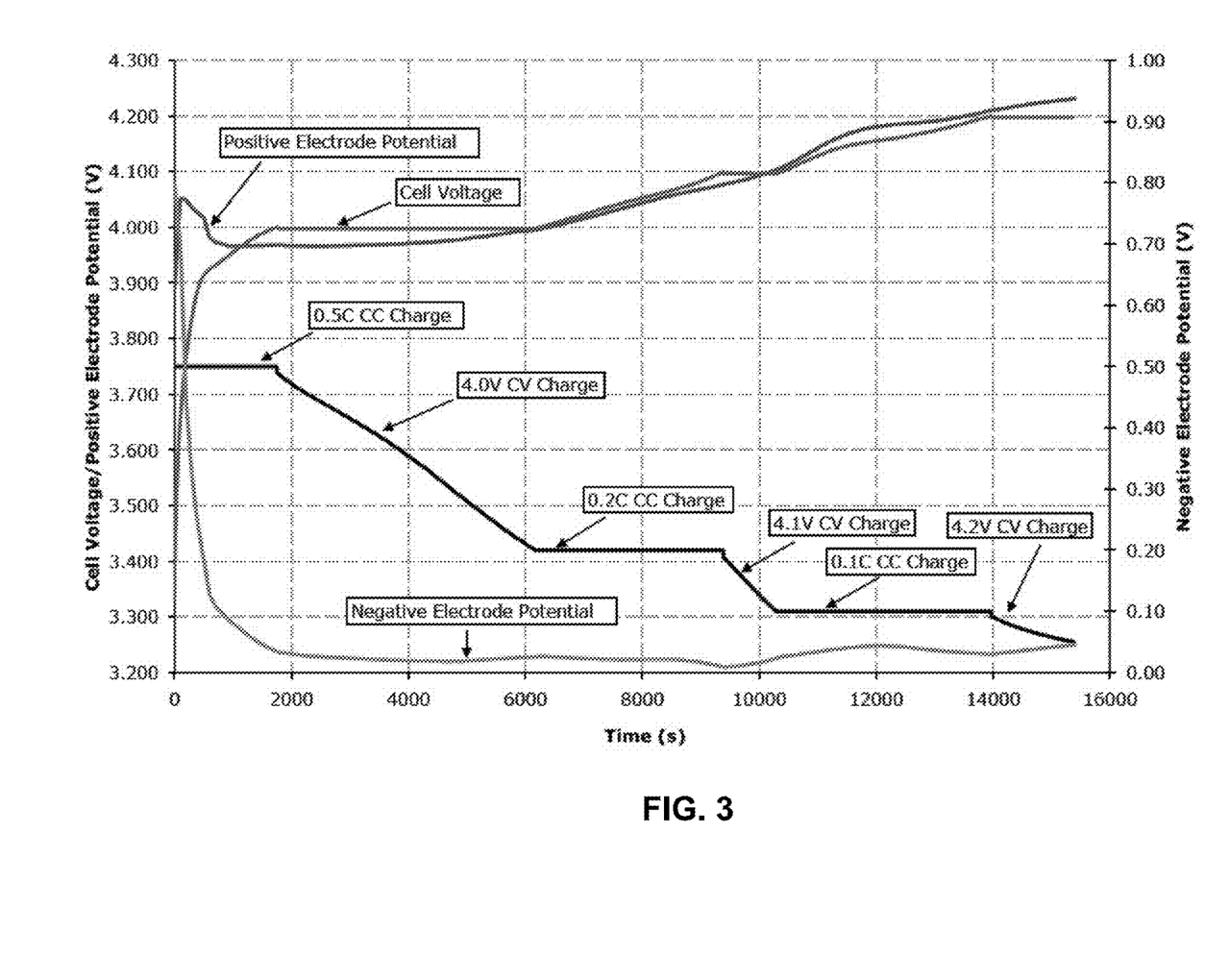
FIG. 3 illustrates a charging profile for a first battery using a CC-CV charging technique in accordance with an embodiment of the present invention.
Figure 4:
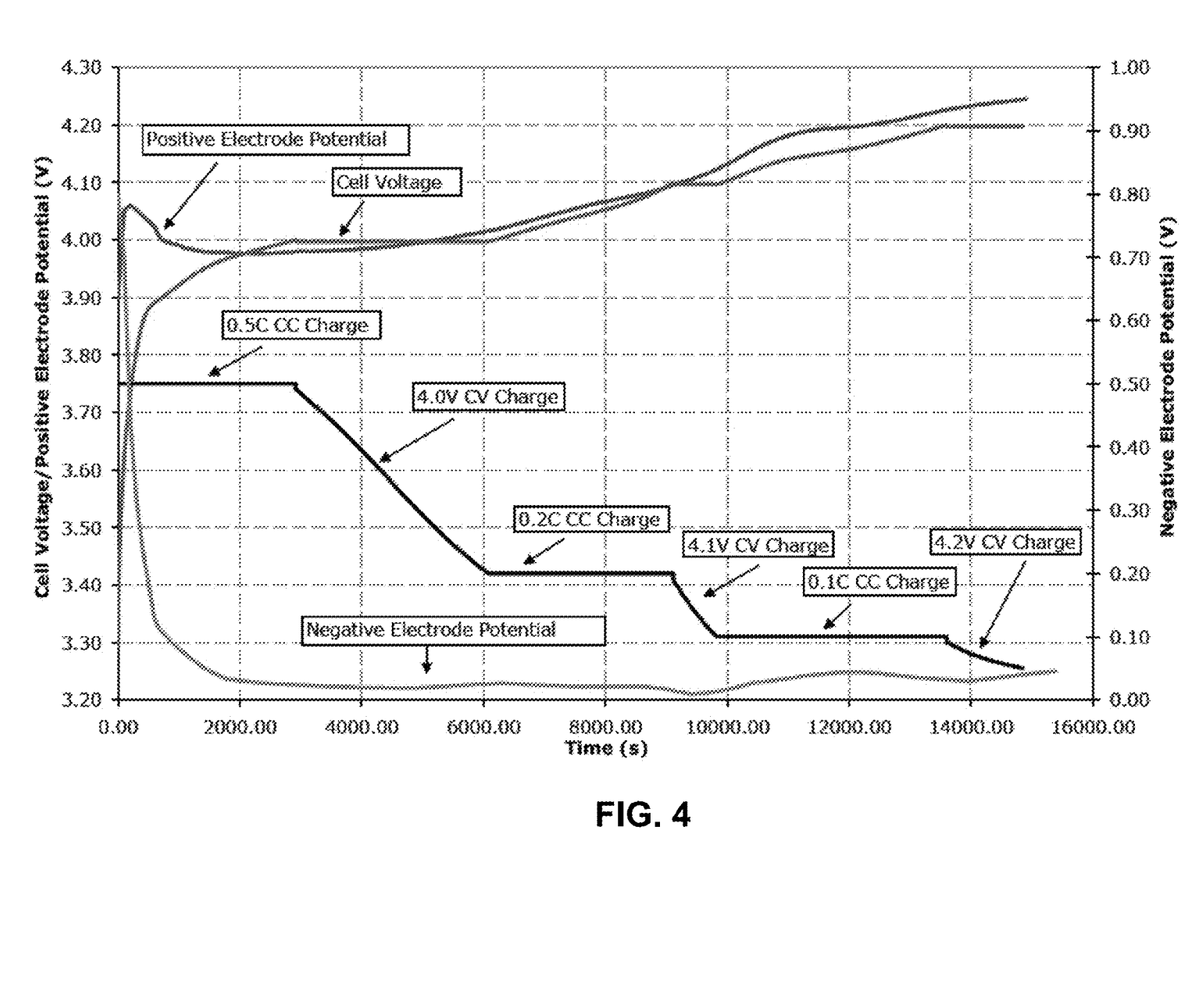
FIG. 4 illustrates a charging profile for a second battery using a CC-CV charging technique in accordance with an embodiment of the present invention.

The adaptive nature of this charging technique can be observed in FIG. 3, which illustrates the performance of a first cell, namely $cell_A$, and in FIG. 4, which illustrates the performance of a second cell, namely $cell_B$. $Cell_A$ and $cell_B$ can be different types of battery cells, or they can be variations of the same type of battery cell. Note that for $cell_A$ the capacity gained during the first 0.5 C constant-current portion (CC1) of the adaptive-charging technique is shorter than that of $cell_B$. This indicates that the diffusion rate capability of $cell_A$ is less than that of $cell_B$ for this particular charging step. The following constant-voltage CV1 charging step in the adaptive charging technique involves holding each cell at a constant 4.0V, and allowing the cell to charge at whatever current level it can accommodate between 0.5 C and 0.2 C. As can be seen in FIGS. 3 and 4, $cell_A$ spends a longer time in the CV1 portion than $cell_B$. For CC2 and CV2, $cell_A$ again charges longer than $cell_B$. In contrast, during the final CC3 and CV3 charging steps, the amount of time taken by $cell_A$ and $cell_B$ is nearly identical. A summary of charge capacity for $cell_A$ and $cell_B$ at each step is summarized in Table 1.

TABLE 1

| Charge Step | | Capacity $cell_A$ (Ah) | Capacity $cell_B$ (Ah) |
| --- | --- | --- | --- |
| CC1 | 0.5 C to 4.0 V | 0.572 | 0.951 |
| CV1 | 4.0 V to 0.2 C | 0.996 | 0.701 |
| CC2 | 0.2 C to 4.1 V | 0.430 | 0.404 |
| CV2 | 4.1 V to 0.1 C | 0.081 | 0.063 |
| CC3 | 0.1 C to 4.2 V | 0.244 | 0.250 |
| CV3 | 4.2 V to 0.05 C | 0.062 | 0.055 |

Additionally, the cumulative and the delta charge capacities between $cell_A$ and $cell_B$ have been summarized in Table 2 below.

By providing a constant-voltage charging portion following each constant-current charging portion, each cell was able to charge effectively, above the 30 millivolt threshold, at slightly different rates, to nearly the same total charge capacity in nearly the same amount of time. Note that the observed differences are due to the differences in cell capacity.

TABLE 2

| Charge Step | | Capacity $cell_A$ (Ah) | Capacity $cell_B$ (Ah) | ΔCapacity |
| --- | --- | --- | --- | --- |
| CC1 | 0.5 C to 4.0 V | 0.572 | 0.9510 | 0.3792 |
| CV1 | 4.0 V to 0.2 C | 1.568 | 1.6525 | 0.0842 |
| CC2 | 0.2 C to 4.1 V | 1.998 | 2.0569 | 0.0589 |
| CV2 | 4.1 V to 0.1 C | 2.079 | 2.1196 | 0.0409 |

TABLE 2-continued

| Charge Step | | Capacity cell$_A$ (Ah) | Capacity cell$_B$ (Ah) | ΔCapacity |
|---|---|---|---|---|
| CC3 | 0.1 C to 4.2 V | 2.323 | 2.3697 | 0.0469 |
| CV3 | 4.2 V to .05 C | 2.385 | 2.4243 | 0.0392 |

This adaptive CC-CV charging technique also has a demonstrated positive influence on low-temperature, 10° C., cycle life performance. When the same multi-step CC-CV charge technique described above is applied to an exemplary cell, versus a single step 0.5 charge to 4.2V, the observed improvement in cycle life can be significant. Note that this multi-step CC-CV adaptive charging technique decreases the capacity variability between the tested cells and increases the cycle life capacity retention during cycle life.

Although this multi-step CC-CV adaptive charging technique is effective in improving charging efficiency and cycle life, it can take a fairly long time to charge (close to 4 hours). In order to address this problem, this technique can be modified to vary the charging process as a function of temperature. For example, the multi-step CC-CV charging technique can be modified as a function of temperature as is shown in Table 3 below.

The advantage of this multi-temperature, adaptive charge technique is that it accounts for the increase in lithium-diffusion rate in the cells at higher temperatures. This allows for lower charging times at temperatures above 20° C., while still ensuring efficient charging and long cycle life across the full temperature range from 10° C. to 45° C. This multi-temperature, adaptive charging technique also has a positive influence on cycle life and low temperatures, such as 10° C.

TABLE 3

| Temp | CC1 | CV1 | CC2 | CV2 | CC3 | CV3 | Charge time |
|---|---|---|---|---|---|---|---|
| 10-20° C. | 0.5 C to 4.0 V | 4.0 V to 0.2 C | 0.2 C to 4.1 V | 4.1 V to 0.1 C | 0.1 C to 4.2 V | 4.2 V to 0.05 C | 3.85 hrs |
| 20-30° C. | 0.5 C to 4.0 V | 4.0 V to 0.3 C | 0.3 C to 4.1 V | 4.1 V to 0.2 C | 0.2 C to 4.2 V | 4.2 V to 0.05 C | 2.85 hrs |
| 30-45° C. | 0.5 C to 4.0 V | 4.0 V to 0.3 C | 0.3 C to 4.2 V | | | 4.2 V to 0.05 C | 2.70 hrs |

Charging System

Figure 5:
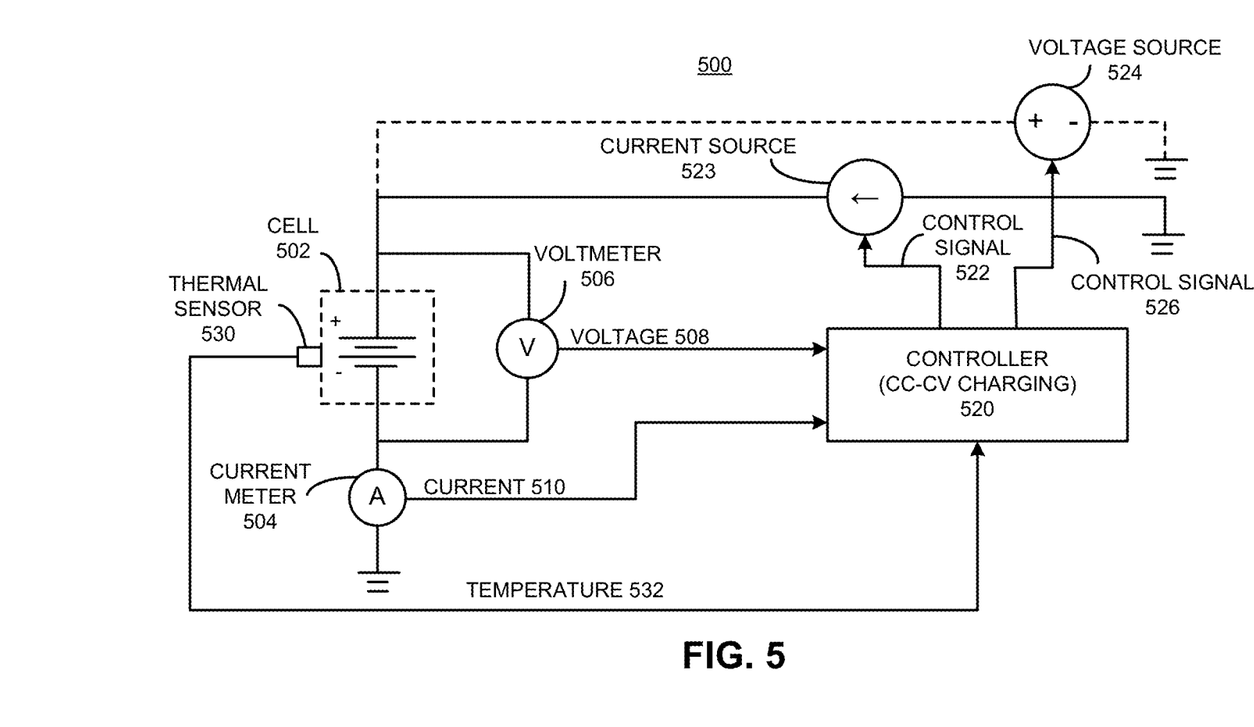
FIG. 5 illustrates a system for charging a battery using a CC-CV charging technique in accordance with an embodiment of the present invention.

FIG. 5 illustrates a rechargeable battery system 500, which uses a CC-CV charging technique in accordance with an embodiment of the present invention. More specifically, the rechargeable battery system 500 illustrated in FIG. 5 includes a battery cell 502, such as a lithium-ion battery cell or a lithium-polymer battery cell. It also includes a current meter (current sensor) 504, which measures a charging current applied to cell 502, and a voltmeter (voltage sensor) 506, which measures a voltage across cell 502. Rechargeable battery system 500 also includes a thermal sensor 530, which measures the temperature of battery cell 502. (Note that numerous possible designs for current meters, voltmeters and thermal sensors are well-known in the art.)

Rechargeable battery system 500 additionally includes a current source 523, which provides a controllable constant charging current (with a varying voltage), or alternatively, a voltage source 524, which provides a controllable constant charging voltage (with a varying current).

The charging process is controlled by a controller 520, which receives: a voltage signal 508 from voltmeter 506, a current signal 510 from current meter 504, and a temperature signal 532 from thermal sensor 530. These inputs are used to generate a control signal 522 for current source 523, or alternatively, a control signal 526 for voltage source 524.

Note that controller 520 can be implemented using either a combination of hardware and software or purely hardware. In one embodiment, controller 520 is implemented using a microcontroller, which includes a microprocessor that executes instructions which control the charging process.

The operation of controller 520 during the charging process is described in more detail below.

Charging Process

Figure 6:
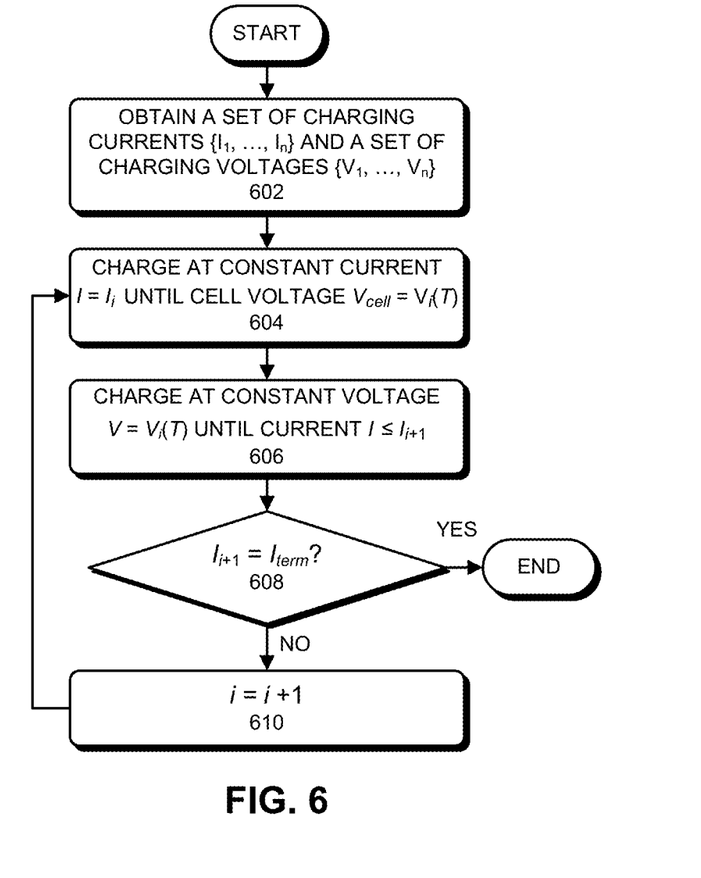
FIG. 6 presents a flow chart illustrating operations involved in performing a CC-CV charging operation in accordance with an embodiment of the present invention.

FIG. 6 presents a flow chart illustrating operations involved in a CC-CV charging operation in accordance with an embodiment of the present invention. First, the system obtains a set of charging currents $\{I_1, \ldots, I_n\}$ and a set of charging voltages $\{V_1, \ldots, V_n\}$ (step 602). This can involve looking up the set of charging currents and the set of charging voltages in a lookup table based on a measured temperature of the battery and a battery type of the battery. As mentioned above, these lookup tables can be generated by performing experiments using a lithium reference electrode to determine how much current/voltage can be applied to the battery before lithium plating takes place.

Next, the system charges the battery cell at a constant current $I=I_i$ until the cell voltage $V_{cell}=V_i(T)$ (step 604). Then, the system charges at a constant voltage $V=V_i(T)$ until the charging current $I \leq I_{i+1}$ (step 606). The system next determines if $I_{i+1}$ equals a terminal current $I_{term}$ (step 608). If so, the process is complete. Otherwise, the counter variable i is incremented, i=i+1 (step 610), and the process repeats.

Advantages

The above-described temperature-dependent multi-step CC-CV charge technique provides the following performance advantages over a conventional constant-current charging technique: (1) eliminating lithium plating at lower temperatures during charging; (2) providing a cell-balancing capability; (3) improving cycle life, thereby enabling extended longevity for portable devices; (4) improving safety due to elimination of Li plating; (5) allowing for lower charging times at higher temperatures; and (6) modifying the charge applied to cells as the cells age over the life of the system.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for charging a battery, comprising:
 obtaining a set of decreasing charging currents $\{I_1, \ldots, I_n\}$ and increasing charging voltages $\{V_1, \ldots, V_n\}$ by looking up the set of charging currents and voltages in a lookup table based on a measured temperature of the battery, wherein the lookup table includes a different set of charging currents and voltages for each different temperature range to facilitate faster charging at higher temperatures; and within a single charging cycle, performing a series of two or more constant-current-constant-voltage charging operations O starting with i=1 and incrementing i with every successive operation until a termination condition is reached, wherein each constant-current-constant-voltage charging operation $O_i$ includes, a constant-current step which involves charging the battery using a constant current $I_i$ until a cell voltage of the battery reaches $V_i$, and a constant-voltage step which involves charging the battery using a constant voltage $V_i$ until a charging current is less than or equal to $I_{i+1}$.

2. The method of claim 1, wherein looking up the set of decreasing charging currents and the set of increasing charging voltages additionally involves using a battery type of the battery to look up the set of decreasing charging currents and the set of increasing charging voltages.

3. The method of claim 1, wherein the termination condition is reached when the charging current $I_i$ equals a terminal charging current $I_{term}$.

4. The method of claim 1, wherein the battery is a rechargeable lithium battery.

5. The method of claim 4, wherein the rechargeable lithium battery is a lithium-polymer battery.

6. The method of claim 4, wherein the rechargeable lithium battery is a lithium-ion battery.

7. The method of claim 6, wherein the lithium-ion battery includes:
a transport-limiting electrode;
an electrolyte;
a separator permeated with the electrolyte; and
a non-transport-limiting electrode.

8. The method of claim 7,
wherein the transport-limiting electrode is a negative electrode; and
wherein the non-transport-limiting electrode is a positive electrode.

9. A battery with a charging mechanism, comprising:
the battery;
a voltage sensor configured to monitor a cell voltage of the battery;
a current sensor configured to monitor a charging current for the battery;
a charging source configured to apply a charging current and a charging voltage to the battery; and
a controller configured to receive inputs from the voltage sensor and the current sensor, and to send a control signal to the charging source, wherein the controller is configured to,
lookup a set of decreasing charging currents $\{I_1, \ldots, I_n\}$ and increasing charging voltages $\{V_1, \ldots, V_n\}$ in a lookup table based on a measured temperature of the battery, wherein the lookup table includes a different set of charging currents and voltages for each different temperature range to facilitate faster charging at higher temperatures;
charge the battery by performing, a series of two or more constant-current-constant voltage charging operations O within a single charging cycle based on the set of charging currents and voltages, starting with i=1 and incrementing i with every successive operation, until a termination condition is reached;

wherein each constant-current-constant-voltage charging operation $O_i$ includes,
a constant-current step which involves charging the battery using a constant current $I_i$ until a cell voltage of the battery reaches $V_i$, and
a constant-voltage step which involves charging the battery using a constant voltage $V_i$ until a charging current is less than or equal to $I_{i+1}$.

10. The battery of claim 9, wherein the battery further comprises a temperature sensor configured to measure a temperature of the battery.

11. The battery of claim 9, wherein the termination condition is reached when the charging current $I_i$ equals a terminal charging current $I_{term}$.

12. The battery of claim 9, wherein the battery is a rechargeable lithium battery.

13. The battery of claim 12, wherein the rechargeable lithium battery is a lithium-polymer battery.

14. The battery of claim 12, wherein the rechargeable lithium battery is a lithium-ion battery.

15. The battery of claim 14, wherein the lithium-ion battery includes:
a transport-limiting electrode;
an electrolyte;
a separator permeated with the electrolyte; and
a non-transport-limiting electrode.

16. The battery of claim 15,
wherein the transport-limiting electrode is a negative electrode; and
wherein the non-transport-limiting electrode is a positive electrode.

17. A charging mechanism for a battery, comprising:
a voltage sensor configured to monitor a cell voltage of the battery;
a current sensor configured to monitor a charging current for the battery;
a temperature sensor configured to measure a temperature of the battery;
a charging source configured to apply a charging current and a charging voltage to the battery; and
a controller configured to,
receive inputs from the voltage sensor, the current sensor and the temperature sensor
look up a set of decreasing charging currents $\{I_1, \ldots, I_n\}$ and increasing charging voltages $\{V_1, \ldots, V_n\}$ in a lookup table based on the measured temperature of the battery, wherein the lookup table includes a different set of charging currents and voltages for each different temperature range to facilitate faster charging at higher temperatures;
send a control signal to the charging source to perform a series of two or more constant-current-constant-voltage charging operations $O_i$ within a single charging cycle based on the set of charging currents and voltages, starting with i=1 and incrementing i with every successive operation, until a termination condition is reached; and
wherein each constant-current-constant-voltage charging operation $O_i$ includes,
a constant-current step which involves charging the battery using a constant current $I_i$ until a cell voltage of the battery reaches $V_i$, and
a constant-voltage step which involves charging the battery using a constant voltage $V_i$ until a charging current is less than or equal to $I_{i+1}$.

18. The charging mechanism of claim 17, wherein the termination condition is reached when the charging current $I_i$ equals a terminal charging current $I_{term}$.

19. The charging mechanism of claim 17, wherein the battery is a rechargeable lithium battery.

* * * * *